(12) United States Patent
McBrearty et al.

(10) Patent No.: US 7,140,040 B2
(45) Date of Patent: Nov. 21, 2006

(54) PROTECTING WIRELESS LOCAL AREA NETWORKS FROM INTRUSION BY EAVESDROPPING ON THE EAVESDROPPERS AND DYNAMICALLY RECONFIGURING ENCRYPTION UPON DETECTION OF INTRUSION

(75) Inventors: Gerald Francis McBrearty, Austin, TX (US); Shawn Patrick Mullen, Buda, TX (US); Johnny Meng-Han Shieh, Austin, TX (US); James Stanley Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 10/132,130

(22) Filed: Apr. 25, 2002

(65) Prior Publication Data

US 2003/0202662 A1 Oct. 30, 2003

(51) Int. Cl.
G06F 11/30 (2006.01)
G06F 12/14 (2006.01)
G06F 15/18 (2006.01)

(52) U.S. Cl. ........................ 726/23; 380/273
(58) Field of Classification Search ............... 380/273, 380/255, 270; 726/23
See application file for complete search history.

(56) References Cited

U.S. PATENT DOCUMENTS

| 4,622,553 | A | * | 11/1986 | Baba et al. ............... 342/91 |
| 4,899,157 | A | * | 2/1990 | Sanford et al. ............... 342/40 |
| 4,935,742 | A | * | 6/1990 | Marin ............... 342/13 |
| 5,093,656 | A | * | 3/1992 | Dipoala ............... 340/522 |
| 5,144,664 | A | * | 9/1992 | Esserman et al. ............... 380/228 |
| 5,307,372 | A | * | 4/1994 | Sawyer et al. ............... 375/133 |
| 5,371,794 | A | * | 12/1994 | Diffie et al. ............... 713/156 |
| 5,461,383 | A | * | 10/1995 | Ono et al. ............... 342/20 |
| 5,602,916 | A | * | 2/1997 | Grube et al. ............... 380/270 |
| 5,627,886 | A | | 5/1997 | Bowman ............... 379/111 |
| 5,727,064 | A | * | 3/1998 | Reeds, III ............... 380/270 |
| 6,021,269 | A | | 2/2000 | Lewis ............... 395/500.26 |
| RE36,946 | E | * | 11/2000 | Diffie et al. ............... 380/278 |
| 6,240,188 | B1 | * | 5/2001 | Dondeti et al. ............... 380/284 |
| 6,314,519 | B1 | | 11/2001 | Davis et al. ............... 713/200 |
| 6,330,333 | B1 | * | 12/2001 | Mizikovsky et al. ............... 380/207 |
| 6,363,154 | B1 | * | 3/2002 | Peyravian et al. ............... 380/283 |
| 6,438,367 | B1 | * | 8/2002 | Crawford ............... 455/410 |
| 6,480,477 | B1 | * | 11/2002 | Treadaway et al. ............... 370/314 |
| 6,526,506 | B1 | * | 2/2003 | Lewis ............... 713/153 |
| 6,539,031 | B1 | * | 3/2003 | Ngoc et al. ............... 370/470 |
| 6,665,285 | B1 | * | 12/2003 | Treadaway et al. ............... 370/338 |
| 6,697,013 | B1 | * | 2/2004 | McFarland et al. ............... 342/159 |

(Continued)

OTHER PUBLICATIONS

Krishnamurthy et al., Security in wireless residential networks, Feb. 2002, IEEE Transactions on Consumer Electronics, vol 48, Issue 1, pp. 157-166.*

(Continued)

*Primary Examiner*—Gilberto Barron
*Assistant Examiner*—David Garcia Cervetti
(74) *Attorney, Agent, or Firm*—Jerry B. Kraft; Mark E. McBurney; Thomas E. Tyson

(57) ABSTRACT

Apparatus for eavesdropping within an area layer adjacent to and surrounding a LAN area periphery for potential wireless transmissions of an intruder having a lower frequency within a level below the LAN frequency; and an implementation responsive to said eavesdropping apparatus for changing the encryption code of said encrypted wireless transmission upon the eavesdropping detection of a wireless transmission of said lower frequency addressed to a network location of one of the terminals in said LAN.

15 Claims, 4 Drawing Sheets

U.S. PATENT DOCUMENTS

| | | | |
|---|---|---|---|
| 6,757,523 B1* | 6/2004 | Fry | 455/78 |
| 6,763,055 B1* | 7/2004 | Fry | 375/132 |
| 2001/0038695 A1 | 11/2001 | Kim | 380/283 |
| 2001/0041591 A1 | 11/2001 | Carroll | 455/577 |
| 2001/0052014 A1 | 12/2001 | Sheymov et al. | 709/225 |
| 2002/0080967 A1* | 6/2002 | Abdo et al. | 380/270 |
| 2002/0197978 A1* | 12/2002 | Zavidniak | 455/410 |
| 2003/0070084 A1* | 4/2003 | Satomaa et al. | 713/200 |
| 2003/0112978 A1* | 6/2003 | Rodman et al. | 380/277 |
| 2004/0214605 A1* | 10/2004 | Zhang et al. | 455/562.1 |

OTHER PUBLICATIONS

Mihaljevic et al., On wireless communications privacy and security evaluation of encryption techniques, Mar. 17-21, 2002, Wireless Communications and Networking Conference, vol 2. p. 865-868 vol. 2.*

Shu Jiang at al., Preventing traffic analysis in packet radio networks, Jun. 2001, DARPA Information Survivability Conference & Exposition II, vol 2, pp. 153-158 vol. 2.*

Zhang et al., Intrusion Detection in Wireless Ad-Hoc Networks, 2000, ACM.*

Michelle Delio, Wireless Networks in Big Trouble, Aug. 20, 2001, Wired News <http://www.wired.com/news/wireless/0,1382,46187,00.html>.*

Matthew Gast, 802.11 Wireless Networks: The Definitive Guide, Apr. 1, 2002, O'Reilly <http://proquest.safaribooksonline.com/>.*

*Intercepting Mobile Communications: The Insecurity of 802.11*, Borisov et al., Proceedings of the 7th Annual International Conference on Mobile Computing and Networking. Rome, Italy, Jul. 16-21, 2001, Annual International Conference on Mobile Computing and Networking, New York, NY: ACM, US, vol. CONF. 7, Jul. 16, 2001, pp. 180-188. XP001072003 ISBN: 1-58113-422-3.

* cited by examiner

PROTECTING WIRELESS LOCAL AREA NETWORKS FROM INTRUSION BY EAVESDROPPING ON THE EAVESDROPPERS AND DYNAMICALLY RECONFIGURING ENCRYPTION UPON DETECTION OF INTRUSION

TECHNICAL FIELD

The present invention relates to the protection of wireless communications and particularly Local Area Network (LAN) communications from unauthorized intrusion through eavesdropping devices.

BACKGROUND OF RELATED ART

Local Area Networks that use radio waves for the unguided transmission of data and protocols come to be known as wireless LANs. The term "wireless" is not completely descriptive since these networks merely reduce the quantity of wire needed to construct a LAN. Wireless LANs may more adequately be described as local area networks in which a portion of the communications are wireless. This follows the tremendous growth in wireless communication products including cellular telephones, wireless personal computers and like devices. Thus, the wireless LAN is conventionally a geographically defined facility, such as a business and manufacturing site, a university site or a government facility within which the workers can unhook from the network connections and move about without restriction to access the Wireless LANs from virtually anywhere within the facility. Car rental facilities use wireless LANs to facilitate check-ins; traders on stock exchange floors use mobile wireless LANs for entering trades; students on university campuses may access lectures, books and notes from any point; medical professionals making rounds may access medical data wirelessly from any point in the hospital plant. Some good background on wireless LANs may be found in the text, *Peter Norton's Complete Guide to Networking*, SAMS Division of MacMillan Computer Publishing, Indianapolis, Ind., 1999, pp. 49–62.

A wireless LAN may be as simple as two laptop computers with radio signal sending and receiving capabilities forming an ad-hoc network on the fly. However, most business networks use a wireless station connectivity enabling a mobile user with a laptop to set up a wireless connection to a hub. The laptop computers still have to be connected to an antenna for transmission to and from the hub. A portable radio antenna may be connected to the laptop through its PCMCIA (Personal Computer Memory Card International Association) slot. The hub that communicates via its own antenna is associated with a server for the client wireless computers.

The IEEE Industry Standard 802.11B Architecture (IEEE 802.11B) extensively used for wireless LAN transmissions in the frequency range of 2.4–2.4835 GHz of spread spectrum radio transmission.

A major problem with these spread spectrum wireless LAN transmissions is that they are not very secure. They are vulnerable to eavesdropping done with relatively simple radio equipment. Anyone equipped with a suitable transceiver within the range of transmission can eavesdrop. In a simple eavesdropping operation, any intruder may circle the perimeter of the target facility in a car or truck equipped with a transceiver and pick up messages since the 2.4 GHz signals must have a range extending for at least a short distance beyond the perimeter of the LAN area. Normally, this type of eavesdropping is not detectable since the sender or the intended receiver has no way of knowing whether the transmission has been intercepted.

A conventional way that users of wireless LANs have defended themselves against the eavesdropping intruders is through encryption of the transmissions with the LAN area. The wireless messages may be encrypted by the client computers in the LAN as well as by the LAN server, e.g. the LAN server associated with the hub. This has presented a problem to the eavesdropping intruders. However, the intruders have been attempting to decipher the encryption keys by a process that involves addressing a message to one of the client wireless client computers in the target LAN. The intruder then expects that the message will be encrypted through the LAN server so that it will be wirelessly transmitted to the addressee client computer in the LAN. The intruder then eavesdrops for the encrypted message which he sent. Now, the intruder has both the unencrypted and encrypted message and can break the secret encryption key. Then all encrypted wireless transmissions within the LAN may be eavesdropped and decrypted.

SUMMARY OF THE PRESENT INVENTION

The present invention involves the recognition that since the eavesdropper is likely to be mobile and operating on a short time cycle, he himself is likely to be wirelessly transmitting his test message.

Consequently, the present invention involves the combination of means for eavesdropping within an area layer adjacent to and surrounding the LAN area periphery for wireless transmissions having a lower frequency within a level below the LAN frequency and addressed to the network location of any one of the computer terminals in the LAN; and means responsive to said eavesdropping means for changing the encryption code of said encrypted wireless transmission upon the eavesdropping detection of a wireless transmission of said lower frequency addressed to a network location of one of the terminals in said LAN.

The invention recognizes that there are several factors contributing to the success of the process of the invention. It is likely that the intruder must send his message at a lower frequency than the 2.4 GHz frequency of the LAN area transmissions because the intruder will probably have to reach a base station tower over a longer distance or range than the adjacent target wireless LAN facility. This insures that the eavesdropping of the present invention will be at a lower frequency and, thus, not interfered with by the transmissions within the LAN. This will make the detection of the lower frequency intruder messages much easier. For best results, when the Wireless LAN is operating under an IEEE Standard 802.11B frequency, the eavesdropping by the system for the intruder test messages must be in the order of 902 MHz.

The means for changing the encryption code preferably dynamically reconfigures the secret key encryption upon said eavesdropping detection without interruption in transmissions within the LAN. Also, the secret key encryption is reconfigured independently of the previous secret key which is being changed.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
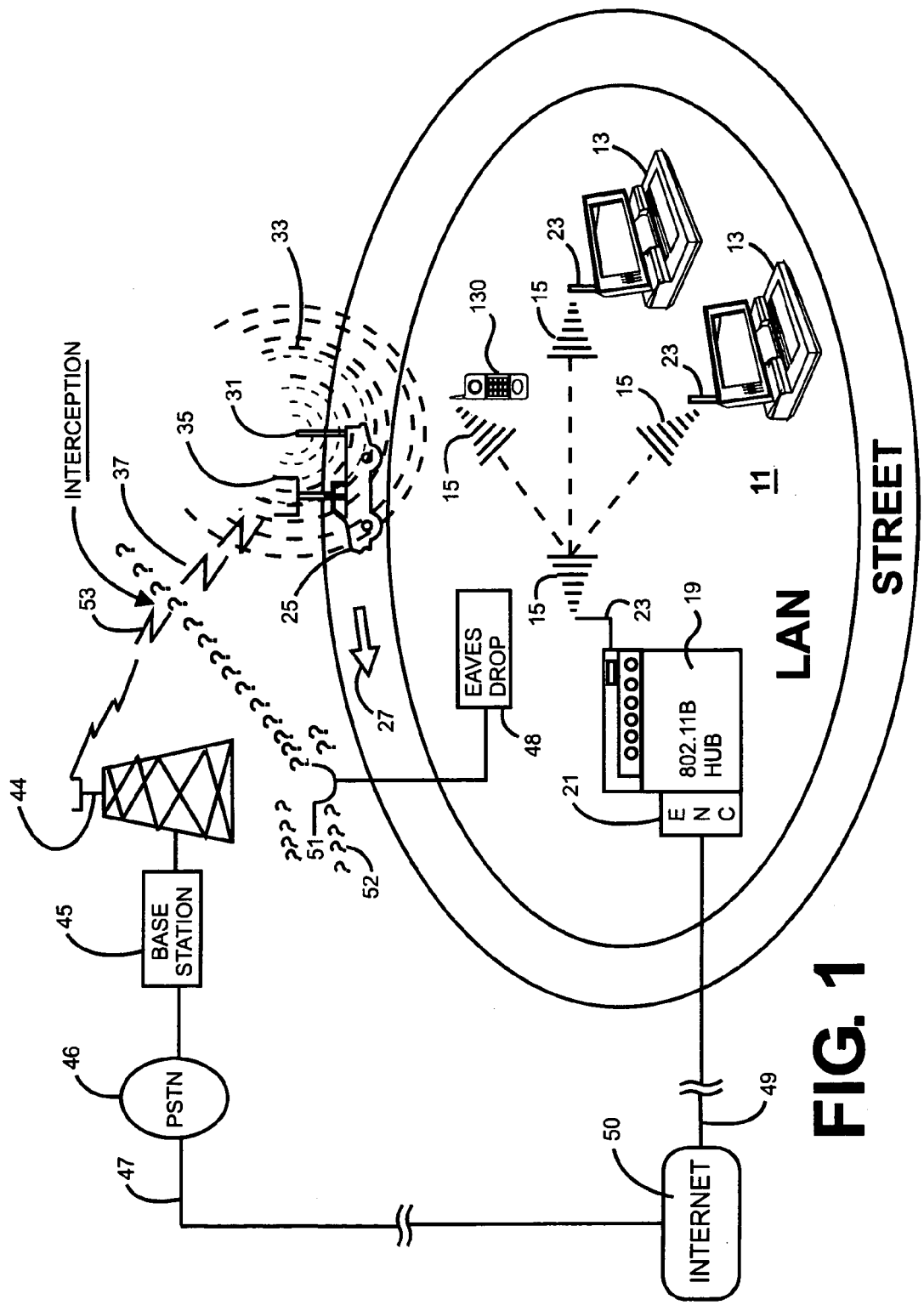
FIG. 1 is a generalized diagrammatic view of a wireless LAN and a communicating Internet portion to illustrate the elements of the present invention.

Referring to FIG. 1, there is provided a generalized view of a wireless LAN and its interconnections to a network, such as the Internet or World Wide Web (Web), so as to illustrate the present invention. The wireless LAN is confined to a facility area 11.

The LAN includes wireless devices, such as PCs 13 or personal digital assistants 130 sending and receiving wireless radio frequency communications 15 through their respective antennae 23 received and sent via corresponding antenna 23 of IEEE 802.11B protocol wireless hub 19 having an associated network server containing secrecy key encryption routine (ENC) 21 that encrypts and decrypts the wireless communications within the LAN so that the routines are encrypted during the wireless transmissions within the LAN. The LAN server in hub 19 may communicate with the Internet 50, for example through appropriate communication linkage 49. Let us assume that intruder truck 25 is cruising on path 27 around a peripheral street surrounding the LAN facility eavesdropping via RF detection waves 33 from antenna 31. The LAN transmissions intercepted by antenna 31 are encrypted, intruder will try to find the encryption key as follows: a signal 37 will be sent via antenna 35 that will contain a test message addressed to one of the client computers 13 in the LAN 11. Since the truck 25 is mobile, the test message signal is wireless and must be sent to a tower antenna 44 of a base station 45 in a wired communication network. The distance from the truck to the tower is greater than the distances between the devices in the wireless LAN, then the transmissions from the truck antenna to the tower 44 have to be a lower frequency than the wireless LAN transmissions.

For example, with the wireless IEEE 802.11B protocols having a frequency of 2.4 GHz, the wireless transmissions of the test message from the truck to the tower 44 are likely to be at a frequency of 902 MHz. Following the intruder's test message through, it may proceed from the Base Station 45 through a standard PSTN (Public Switching Telephone Network) 46, then via wired connection 47 through a network, such as Internet 50, back to hub via interconnection 49 back to encryptor 21 of the server in the hub 19 of the LAN. The message from the truck will now be encrypted. Thus, if the truck through the detection waves 33 from antenna 31 now intercepts the encrypted test message to a particular wireless client address, the intruder will now have both the unencrypted and encrypted versions. From this pair, the intruder may be able to decipher the secret encryption key.

As will be subsequently described in greater detail, the present invention sets up an eavesdropping system 48 that sends detection waves "??????????????" 52 via antenna 51. With the knowledge that the intruder truck is probably sending the test message initially wirelessly at a lower frequency of 902 MHz, the system of this invention tries to detect such transmissions. In FIG. 1, there is such an illustrative interception of a lower frequency transmission by the systems eavesdropping implementation at point 53. In response, as will hereinafter be described in greater detail, the system thus determines that there is an intruder and begins a dynamic reconfiguration of the secret encryption key in the wireless LAN. This reconfiguration should be completed before the intruder can decipher the initial secret encryption. Thus, the intruder fails.

Figure 2:
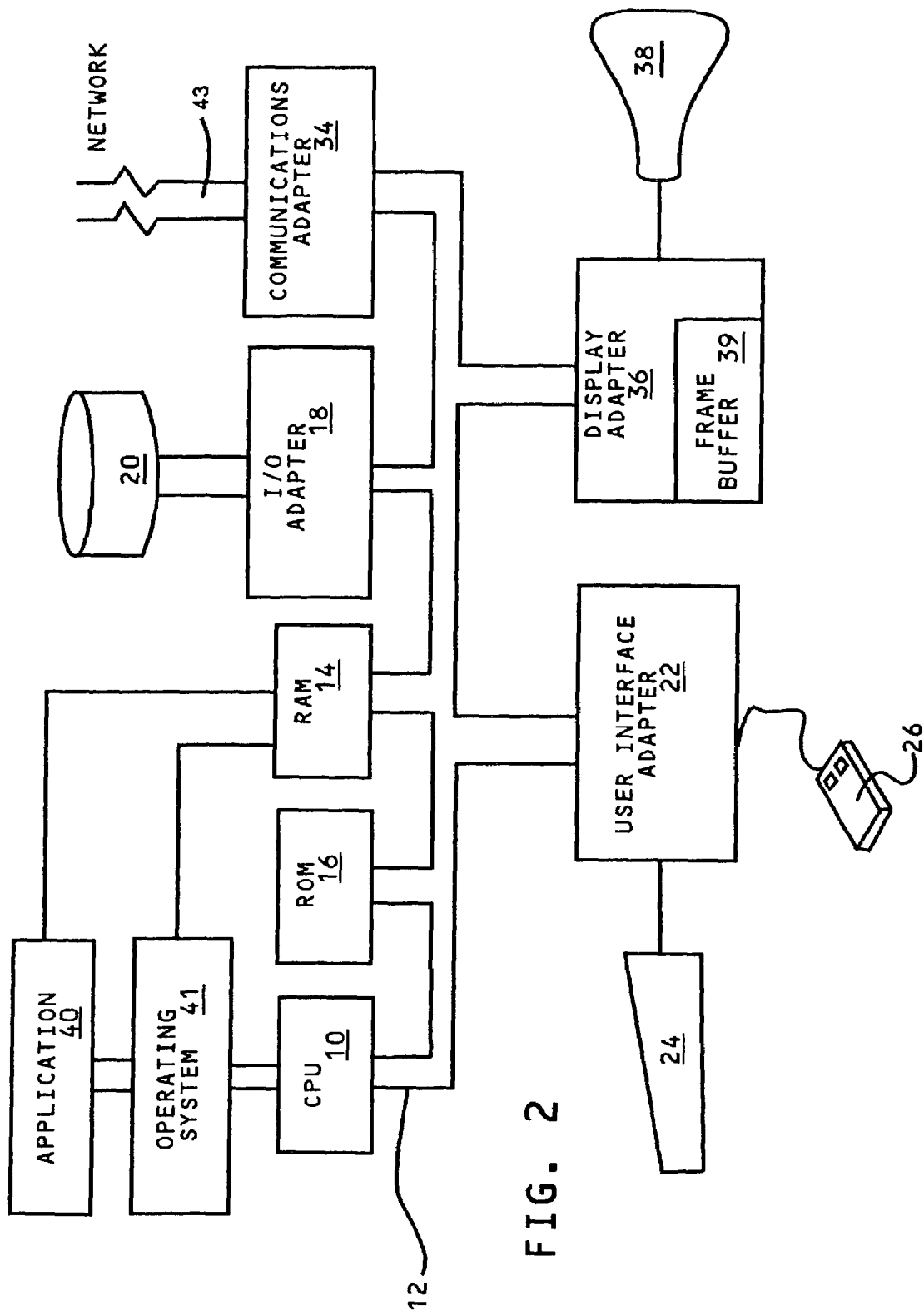
FIG. 2 is a block diagram of a data processing system including a central processing unit and network connections via a communications adapter that is capable of functioning as the LAN servers for encrypting and dynamically reconfiguring the secret encryption keys upon the detection of wireless transmissions of test messages indicative of an intruder.

Referring now to FIG. 2, a typical generalized data processing system display terminal is shown that may function as the computer server for controlling the wireless LAN of this invention, as well as the client PC computers. A central processing unit (CPU) 10, such as any PC microprocessor in a PC available from International Business Machines Corporation (IBM) or Dell Corp., is provided and interconnected to various other components by system bus 12. An operating system 41 runs on CPU 10, provides control and is used to coordinate the functions of the various components of FIG. 1. Operating system 41 may be one of the commercially available operating systems such as Microsoft's Windows98™ or WindowsNT™, as well as the UNIX or AIX operating systems. An application program that includes routines of the present invention for eavesdropping on the eavesdroppers, to be subsequently described in detail, runs in conjunction with operating system 41 and provides output calls to the operating system 41, which in turn implements the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a Small Computer System Interface (SCSI) adapter that communicates with the disk storage device 20, i.e. a hard drive. Communications adapter 34 interconnects bus 12 with an outside network linkage 43 in the case of the LAN server enabling the data processing system to communicate with other such systems over a network includes, of course, the Internet or Web. In the server that is associated with the hub shown in FIG. 1, encryption applications are stored with applications 40 and loaded into RAM during encryption/decryption. I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. There may be a display associated with the LAN server. In such a set up, display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the mouse or related devices, a user is capable of inputting information to the system through the keyboard 24 or mouse 26 and receiving output information from the system via display 38.

Figure 3:
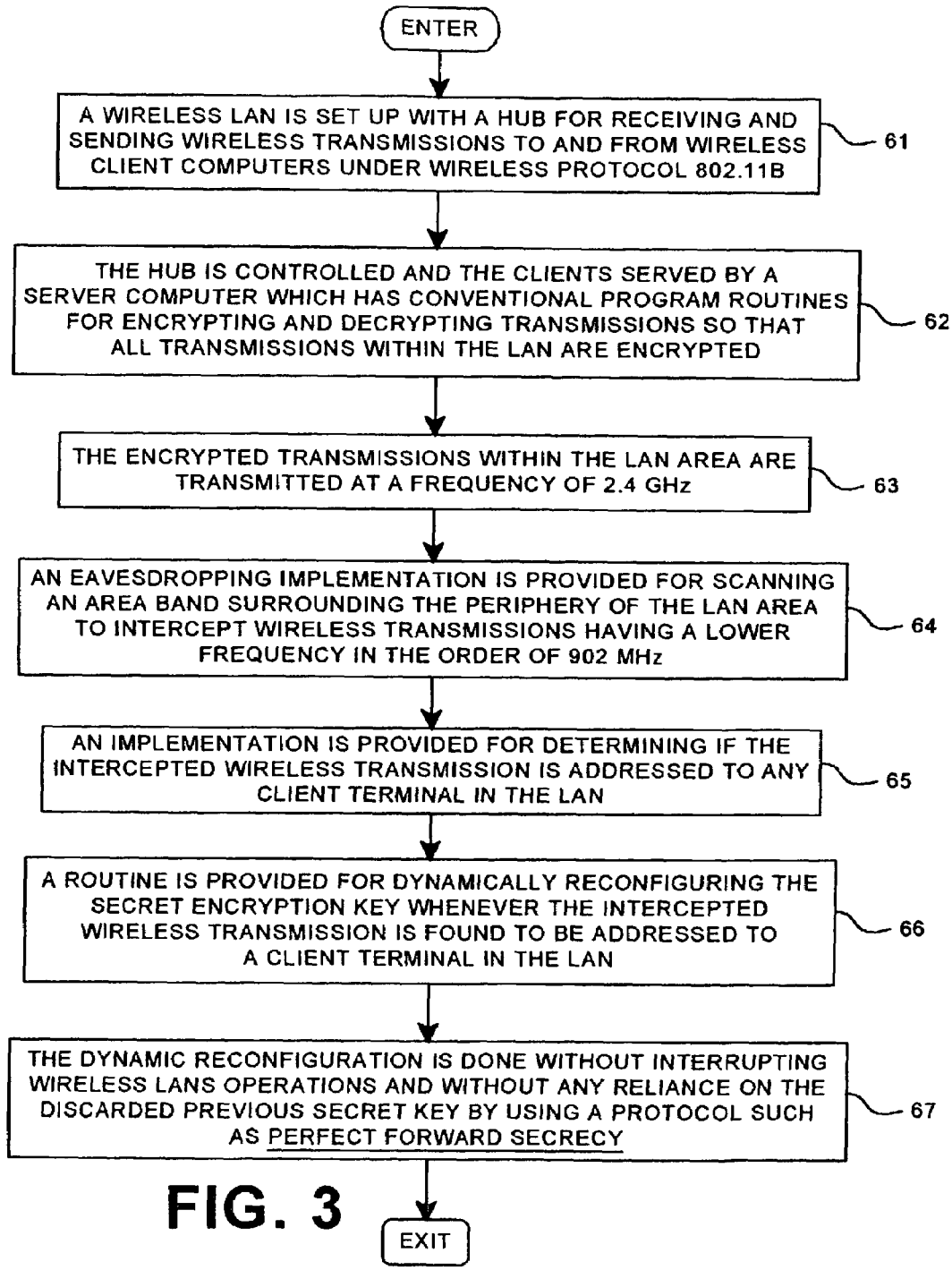
FIG. 3 is an illustrative flowchart describing the setting up of the elements of a program according to the present invention for protecting the wireless LAN from eavesdroppers.

Now, with reference to the programming shown in FIG. 3, there will be described how the system and programs of the present invention are set up.

The invention involves the protection of a wireless LAN with a hub for receiving and sending wireless transmissions to and from wireless client computers under protocol IEEE 802.11B, step 61. These 802.11 protocols, which are widely used in the wireless LAN technology, are discussed in greater detail at pp. 60–62 in the above-referenced *Peter Norton's Complete Guide to Networking* text, as well as in the article, *A Wireless Local Area Network Protocol That Improves Throughput Via Adaptive Control*, B. E. Mullins et al., *Proceedings of the IEEE International Conference on Communications*, pp. 1427–1431, June 1997. The Hub is controlled and the client computers in the LAN are served by a server computer that has conventional program routines for encrypting and decrypting transmissions so that all wireless transmissions within the LAN are encrypted, step 62. The system uses secret or shared key encryption/decryption, for example as set forth in the *Internet Key Exchange (IKE)* protocols as published 1998, by the *Internet Society* and publicly available as *RFC* 2409, Harkins et al. November 1998. The encrypted LAN transmissions are at a frequency of 2.4 GHz, step 63. An eavesdropping implementation is provided for scanning an area surrounding the periphery of the LAN area to intercept wireless transmissions having a lower frequency in the order of 902 MHz, step 64. Eavesdropping equipment to scan for such transmissions is readily available and inexpensive to set up. Any modified off-the-shelf device may be used to scan for the 902 MHz transmissions. In other words, the same eavesdropping equipment used by the intruders to eavesdrop may be used against the intruders when they transmit wirelessly. Reference may be made to the article, *Intercepting Mobile Communication, The Insecurity of* 802.11, M. Borisov et al., published by the 7th Annual International Conference of Mobile Computing and Networking, July 2001, for illustrative examples of eavesdropping equipment that may be used. Accordingly, an implementation is provided for determining if an intercepted wireless transmission is addressed to any client computer terminal in the LAN, step 65. Then, a routine is provided for reconfiguring the secret encryption key whenever the intercepted wireless transmission is found to be addressed to a client terminal in the Wireless LAN, step 66. Conventional routines for dynamically reconfiguring secret encryption keys are described in the above-mentioned *Internet Key Exchange (IKE)* protocols as part of "Perfect Forward Secrecy" routines, referenced in Sections 3.3 and 5.5 "Quick Mode". This dynamic reconfiguration of the secret key is done without interrupting the Wireless LAN operations and without any reliance on the discarded previous key by using routines available under "Perfect Forward Secrecy", step 67.

Figure 4:
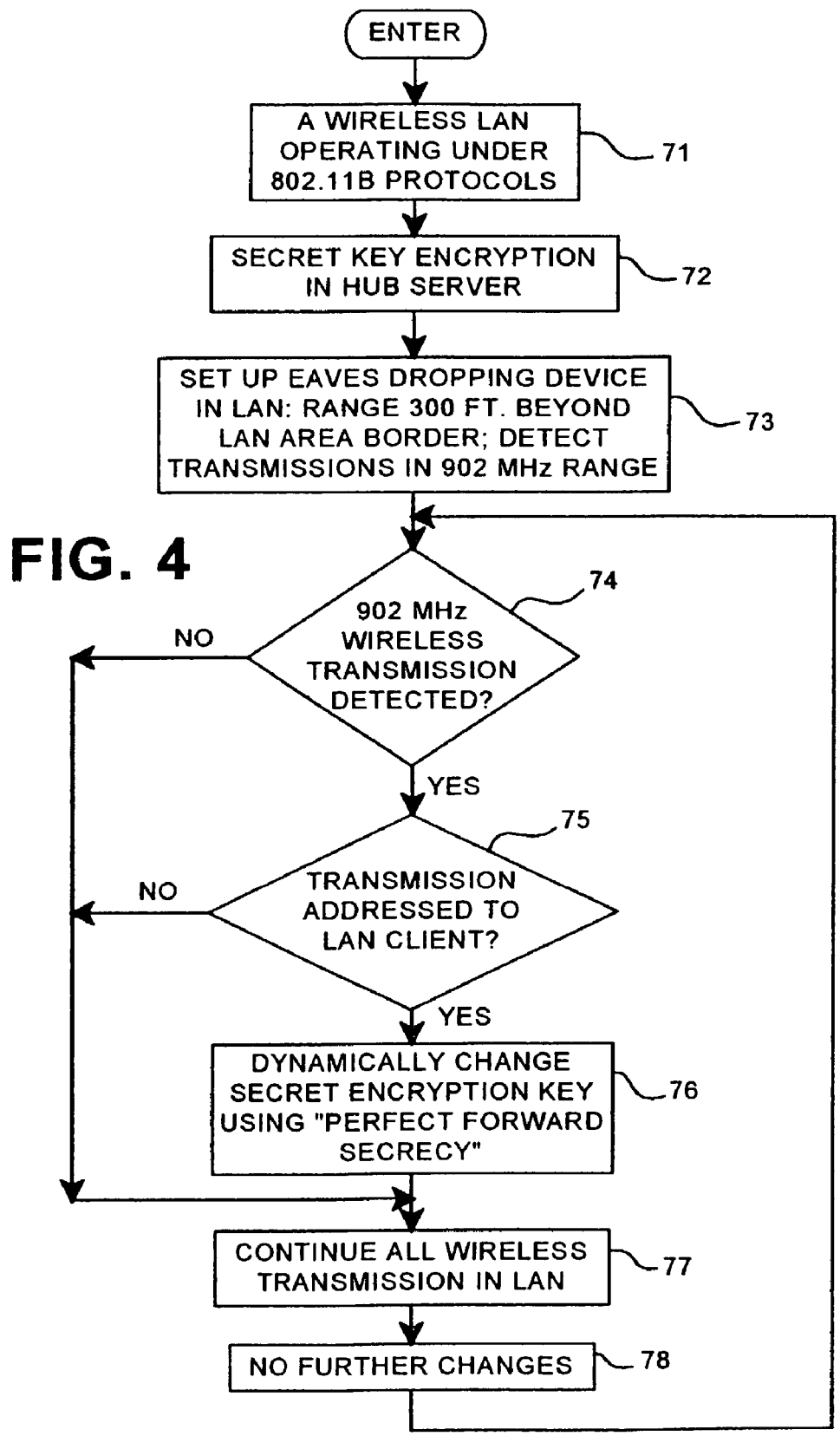
FIG. 4 is a flowchart of an illustrative run of the program set up in FIG. 3.

Now, with reference to the flowchart of FIG. 4, a simplified illustrative run of the process set up in FIG. 3 will be described. The simplification is made so as to illustrate an understandable process. In considering this example, it should be understood that in many processes the criteria for eavesdropping on the wireless transmissions for the intruder may be more complex. However, the complexity of such a determination is not the present invention. The invention involves the eavesdropping on the mobile intruder's wireless communications so as to determine whether he is addressing wireless LAN client computers. In a wireless LAN operating under 802.11B protocols, step 71, with secret key encryption at the Hub server, step 72, a conventional radio frequency eavesdropping device is set up to monitor for wireless transmissions in the order of 902 MHz at a range just about 300 feet beyond the LAN area border, step 73. Thus, a determination is made as to whether such a 902 MHz wireless transmission has been detected, step 74. If Yes, a further determination is made as to whether the intercepted transmission had a final address to one of the clients in the wireless LAN, step 75. If Yes, then the secret encryption key is changed using the appropriate "Perfect Forward Security" routine described above, step 76. Then, or if the determination in either step 74 or step 75 is No, the wireless transmissions in the LAN are continued uninterrupted, step 77, and no further changes need be made, step 78, the process is returned to step 74 where the eavesdropping for a further intruder transmission is continued.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a wireless local area network (LAN) comprising a plurality of computer controlled terminals within a defined area, a system for the secure wireless transmission of data to and from computer terminals in the LAN comprising:
   means for wireless transmission of data to and from computer terminals in the LAN at a selected LAN frequency level;
   means for encrypting said wireless transmissions within said LAN;
   means for eavesdropping within an area layer adjacent to and surrounding the LAN area periphery for wireless transmissions having a lower frequency within a level below the LAN frequency, whereby said lower frequency transmission would be directed to a remote location outside of said LAN area; and
   means responsive to said eavesdropping means for changing the encryption code of said encrypted wireless transmission upon the eavesdropping detection of a wireless transmission of said lower frequency addressed to a network location of one of the terminals in said LAN.

2. The wireless transmission system of claim 1 wherein said means for encrypting uses secret key encryption.

3. The wireless transmission system of claim 2 wherein the means for changing the encryption code dynamically reconfigures the secret key encryption upon said eavesdropping detection without interruption in transmissions within the LAN.

4. The wireless transmission system of claim 3 wherein said means for changing the encryption code reconfigures the secret key encryption independently of the previous secret key.

5. The wireless transmission system of claim 2 wherein said wireless transmission of data in the LAN has a selected frequency level in the order of 2.4 GHz.

6. The wireless transmission system of claim 5 wherein said means for eavesdropping detects wireless transmissions at a level in the order of 902 MHz.

7. A method for the secure wireless transmission of data to and from computer terminals in a wireless local area network (LAN) including a plurality of computer controlled terminals within a defined area comprising:
   wirelessly transmitting data to and from computer terminals in the LAN at a selected LAN frequency level;

encrypting said wireless transmissions within said LAN;

eavesdropping within an area layer adjacent to and surrounding the LAN area periphery for wireless transmissions having a lower frequency within a level below the LAN frequency, whereby said lower frequency transmission would be directed to a remote location outside of said LAN area; and changing the encryption code of said encrypted wireless transmission upon the eavesdropping detection of a wireless transmission of said lower frequency addressed to a network location of one of the terminals in said LAN.

8. The method of claim 7 wherein said encrypting step uses secret key encryption.

9. The method of claim 8 wherein said step of changing the encryption code dynamically reconfigures the secret key encryption upon said eavesdropping detection without interruption in transmissions within the LAN.

10. The method of claim 9 wherein said step of changing the encryption code reconfigures the secret key encryption independently of the previous secret key.

11. The method of claim 8 wherein said wireless transmission of data in the LAN has a selected frequency level in the order of 2.4 GHz.

12. The method of claim 11 wherein said eavesdropping detects wireless transmissions at a level in the order of 902 MHz.

13. A computer program having code recorded on a computer readable medium for the secure wireless transmission of data to and from computer terminals in a wireless local area network (LAN) including a plurality of computer controlled terminals within a defined area comprising:

means for wireless transmission of data to and from computer terminals in the LAN at a selected LAN frequency level;

means for encrypting said wireless transmissions within said LAN;

means for eavesdropping within an area layer adjacent to and surrounding the LAN area periphery for wireless transmissions having a lower frequency within a level below the LAN frequency, whereby said lower frequency transmission would be directed to a remote location outside of said LAN area; and means responsive to said eavesdropping means for changing the encryption code of said encrypted wireless transmission upon the eavesdropping detection of a wireless transmission of said lower frequency addressed to a network location of one of the terminals in said LAN.

14. The computer program of claim 13 wherein said means for encrypting uses secret key encryption.

15. The computer program of claim 14 wherein the means for changing the encryption code dynamically reconfigures the secret key encryption upon said eavesdropping detection without interruption in transmissions within the LAN.

* * * * *